J. W. GAINES.

Millstone Dress.

No. 28,850.

Patented June 26, 1860.

Witnesses:

Inventor:

UNITED STATES PATENT OFFICE.

JAMES W. GAINES, OF MELROSE, TEXAS.

MILLSTONE-DRESS.

Specification of Letters Patent No. 28,850, dated June 26, 1860.

*To all whom it may concern:*

Be it known that I, JAMES W. GAINES, of Melrose, in the county of Nacogdoches and State of Texas, have invented a new and useful Improvement in Millstone-Dress; and I do hereby declare that the following is a full, clear, and exact description of the same, reference being had to the accompanying drawings, forming a part of this specification, in which—

Figure 1:
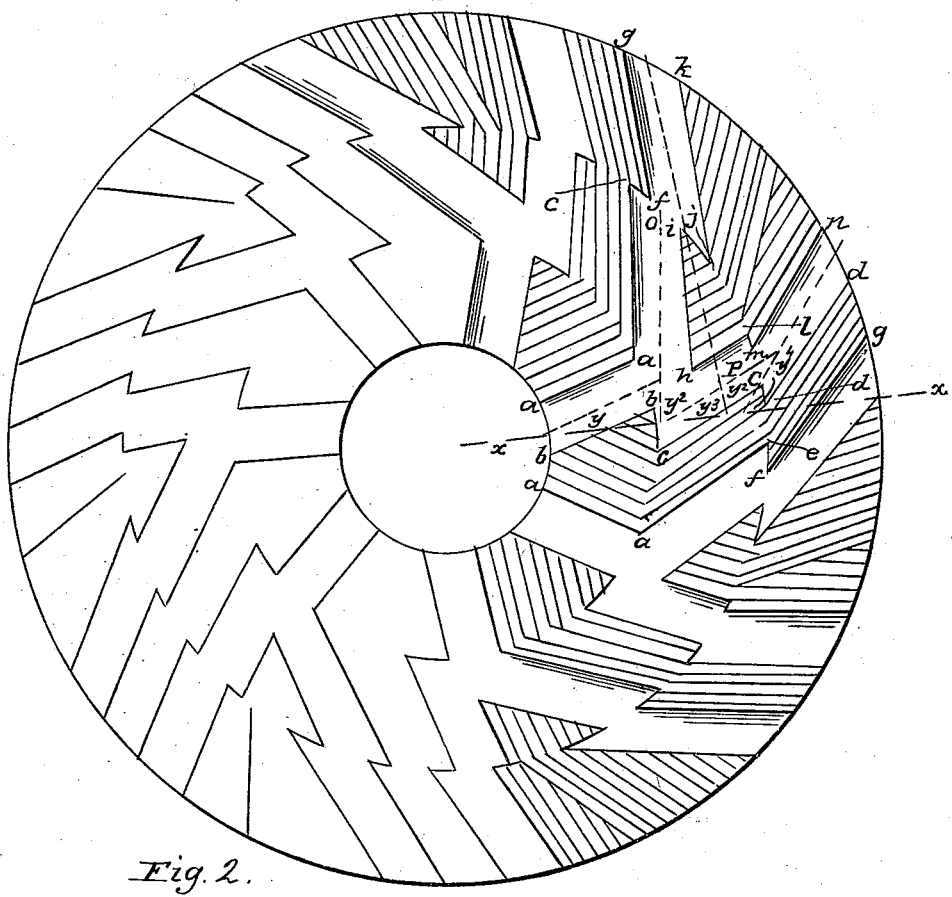
Figure 2:

Figure 1, is a plan, and Fig. 2, a vertical central section of a millstone dressed according to my improved plan.

Similar letters of reference, in each of the several figures, indicate corresponding parts.

The nature of my invention consists in making each of the main grooves in five sections, in combination with shoulders and inclined planes in the manner and for purposes hereinafter described.

To enable others, skilled in the art, to make and use my invention, I will proceed to describe its construction and operation.

The grooves are made deep and with abrupt edges along the lines $a$, $a$, $a$, $e$, $f$, $g$, and $h$, $l$, $m$, $n$, and are made tapering toward the opposite lines $b$, $b$, $h$, $i$, $j$, $k$, $c$, $c$, and $d$, $d$. The center line of the section $a$, $a$, $b$, $b$, nearest the center of the millstone forms a small angle $y$, with the radial line $x$ $x$; the angle $y'$, of the center line of the middle section $a$, $e$, $h$, $i$, with the radial line $x$, $x$, is larger than the angle $y$; and the angle $y''$, of the center line of the outer section $f$, $g$, $j$, $k$, with the radial line $x$, $x$, is larger than the angle $y'$. In similar manner the angle $y^3$, of the middle section $h$, $l$, $c$, $c$, is larger than angle $y$, and angle $y^4$, of the outer section $d$, $m$, $n$, $d$, is larger than angle $y^3$. Thus it will be seen the sections deviate more from a radial line, the greater their distance from the center. It will also be seen from Fig. 2, that the depth of the grooves decreases from the center toward the circumference.

The land or grinding surface between the grooves is serrated so as to present cutting edges to the grain to be ground.

The grinding surfaces $b$, $b$, $c$, $c$, $c$, $d$, and $h$, $i$, $j$, are provided with abrupt shoulders $b$ $c$, $c$ $d$ and $i$ $j$, respectively at their outer edges while the inner edges $e$, $f$, and $l$ $m$, of the grinding surfaces $e$ $f$ $g$, and $n$ $l$ $m$, are made to taper into the grooves behind them.

On account of the nearly radial disposition of the inner sections of the grooves, I gain a large grinding surface $a$ $b$ $a$ $b$, between each two grooves near the center of the millstone. The main portion of the grain while being ground, passes from the grinding surface $a$, $b$, $a$, $b$, successively onto grinding surfaces $a$ $c$ $e$ $c$, and $f$ $d$ $d$ $g$. A portion of the grain will pass over edge $a$ $e$, and shoulder $b$ $c$, into the middle grooves. The grain passing over edge $a$ $e$, into groove $a$ $h$ $e$ $i$, will be guided (by the inclined plane $o$ $e$ $f$, at the outer end of the groove $a$ $h$ $e$ $i$) onto the outer grinding surface $e$ $f$ $g$, and thus be submitted to a second grinding process. The grain passing over shoulder $b$ $c$, into groove $c$, $h$ $l$ $c$, will be guided (by the inclined plane $p$ $l$ $m$, at the outer end of the groove $c$ $h$ $l$ $c$) onto the outer grinding surface $l$ $m$ $n$, once more to be ground. By this arrangement of grooves, shoulders, and inclined planes it will be seen, I obtain a thorough grinding even for the grain which would otherwise pass out through the grooves impartially or not at all ground, and thus my millstones are far more effective than if dressed according to any of the usual methods heretofore in use.

What I claim as my invention and desire to secure by Letters Patent, is—

Making each of the main grooves in five sections $a$ $a$ $b$ $b$, $a$ $h$ $i$ $e$, $j$ $f$ $g$ $k$, $c$ $h$ $l$ $d$, $m$ $d$ $n$ $d$, in combination with shoulders $b$ $c$, $i$ $j$, and inclined planes $o$ $e$ $f$, $p$ $m$ $l$, in the manner and for the purposes described.

J. W. GAINES.

Witnesses:
GOODWIN Y. AT LEE,
R. W. FENWICK.